United States Patent
Jensen et al.

(10) Patent No.: US 10,042,054 B2
(45) Date of Patent: Aug. 7, 2018

(54) OPTICAL INDIVIDUAL-POINT MEASUREMENT

(71) Applicants: Hexagon Technology Center GmbH, Heerbrugg (CH); Hexagon Metrology GmbH, Wetzlar (DE)

(72) Inventors: Thomas Jensen, Rorschach (CH); Knut Siercks, Mörschwil (CH); Peter Champ, Pinner (GB); Matthias Geil, Herborn (DE)

(73) Assignees: HEXAGON TECHNOLOGY CENTER GMBH, Heerbrugg (CH); HEXAGON METROLOGY GMBH, Wetzlar (DE)

( * ) Notice: Subject to any disclaimer, the term of this patent is extended or adjusted under 35 U.S.C. 154(b) by 804 days.

(21) Appl. No.: 14/167,918

(22) Filed: Jan. 29, 2014

(65) Prior Publication Data
US 2014/0211191 A1    Jul. 31, 2014

(30) Foreign Application Priority Data
Jan. 30, 2013    (EP) .................................... 13153315

(51) Int. Cl.
*G01S 17/02* (2006.01)
*G01S 17/08* (2006.01)
(Continued)

(52) U.S. Cl.
CPC .......... *G01S 17/023* (2013.01); *G01B 11/026* (2013.01); *G01C 3/06* (2013.01); *G01C 15/002* (2013.01); *G01S 17/08* (2013.01)

(58) Field of Classification Search
CPC ..... G01S 17/023; G01S 17/08; G01B 11/026; G01C 3/06; G01C 15/002
See application file for complete search history.

(56) References Cited

U.S. PATENT DOCUMENTS

| 5,402,582 A | 4/1995 | Raab |
| 6,014,206 A * | 1/2000 | Basting .................. G01B 11/26 |
| | | 356/138 |

(Continued)

FOREIGN PATENT DOCUMENTS

| DE | 4325337 A1 | 2/1994 |
| DE | 4325347 A1 | 2/1994 |

(Continued)

OTHER PUBLICATIONS

Pavlicek et al., "Theoretical Measurement Uncertainty of White-Light Interferometry on Rough Surfaces", Applied Optics, vol. 42, pp. 1809-1813 (2003).

(Continued)

*Primary Examiner* — Samantha K Abraham
(74) *Attorney, Agent, or Firm* — Maschoff Brennan (57) ABSTRACT

A distance measuring method for a point on an object is performed by emitting measurement radiation. When an optical measurement axis of the measurement radiation is aligned with the point to be measured, an optical measurement point region is defined by the beam cross section of the radiation on the object. The beam cross section may be, for example, a maximum of eight times the standard deviation of a Gaussian steel profile of the measurement radiation. The the distance to the point on the object is determined by receiving measurement radiation reflected from the object. The method includes altering, at least once, a measurement direction as emission direction of the measurement radiation with respective emission and reception of the measurement radiation. Altering the measurement direction is carried out such that respective area centroids defined by the beam cross section on the object lie within the measurement point region.

14 Claims, 4 Drawing Sheets

(51) Int. Cl.
  *G01C 15/00*   (2006.01)
  *G01C 3/06*   (2006.01)
  *G01B 11/02*   (2006.01)

(56) References Cited

U.S. PATENT DOCUMENTS

| | | | |
|---|---|---|---|
| 2001/0000021 A1 | 3/2001 | Beck | |
| 2003/0116713 A1* | 6/2003 | Cooke | G01T 1/1647 |
| | | | 250/369 |
| 2006/0182314 A1 | 8/2006 | England et al. | |
| 2006/0201006 A1 | 9/2006 | Burlingham et al. | |
| 2012/0314210 A1* | 12/2012 | Wick, Jr. | G01J 1/4257 |
| | | | 356/121 |

FOREIGN PATENT DOCUMENTS

| | | |
|---|---|---|
| DE | 197 36 588 A1 | 3/1998 |
| DE | 198 36 812 A1 | 2/2000 |
| DE | 102005061464 A1 | 7/2007 |
| EP | 1686350 A1 | 8/2006 |
| EP | 1474650 B2 | 6/2007 |
| EP | 2037214 A1 | 3/2009 |
| FR | 2 654 218 A1 | 5/1991 |
| FR | 2738343 A1 | 3/1997 |

OTHER PUBLICATIONS

Wiesner et al., "Improved White-Light Interferometry on Rough Surfaces by Statistically Independent Speckle Patterns", Applied Optics, vol. 51, pp. 751-757 (2012).

Adler et al., "Speckle Reduction in Optical Coherence Tomography Images by Use of a Spatially Adaptive Wavelet Filter", Opt. Lett. 29, pp. 2878-2880 (2004).

Harasaki et al., "Fringe Modulation Skewing Effect in White-Light Vertical Scanning Interferometry", Applied Optics, vol. 39, p. 2101 (2000).

European Search Report dated Jun. 26, 2013 as received in Application No. EP 13 15 3315.

Fleischle, et al., "Investigation of the relationship between spectral scanning and achievable measurement uncertainty during chromatic-confocal microscopy on rough objects", DGAO Proceedings, 2010, 2 pages.

* cited by examiner

OPTICAL INDIVIDUAL-POINT MEASUREMENT

FIELD OF THE INVENTION

The invention relates to a distance measuring method for a point, a measuring apparatus for determining distance and a computer program product.

BACKGROUND

Determining the distance to measurement points forms the basis for a multiplicity of measurement tasks and for corresponding measuring apparatuses. Optical distance measurement, in particular, is used for example for measuring apparatuses in surveying (geodesy) or in industrial workpiece checking or measurement. This can involve, for example, determining coordinates of points in the terrain or on a workpiece to be monitored. Advantages of these methodologies include, in particular, a broad field of application on account of the large measurement range and the comparatively high measurement accuracies which can be provided e.g. by interferometer distance measurement.

For measuring a target point, numerous geodetic surveying apparatuses have been known since ancient times. In this case, direction or angle and usually also distance from a measuring apparatus to the target point to be measured are recorded and, in particular, the absolute position of the measuring apparatus together with reference points possibly present are detected as spatial standard data.

Generally known examples of such geodetic surveying apparatuses include the theodolite, tachymeter, total station and also laser scanner, which are embodied in the terrestrial and airborne variants. One geodetic measuring device from the prior art is described in the publication document EP 1 686 350, for example. Such apparatuses have electrical-sensor-based angle and distance measuring functions that permit direction and distance to be determined with respect to a selected target. In this case, the angle and distance variables are determined in the internal reference system of the apparatus and, if appropriate, also have to be combined with an external reference system for absolute position determination.

Modern total stations have microprocessors for digital further processing and storage of detected measurement data. The apparatuses generally have a compact and integrated design, wherein coaxial distance measuring elements and also computer, control and storage units are usually present in an apparatus. Depending on the application, total stations are additionally equipped with motorization of the targeting or sighting device and—in the case of the use of retroreflectors (for instance an all-round prism) as target objects—means for automatic target seeking and tracking. As a human-machine interface, the total station can have an electronic display control unit—generally a microprocessor computing unit with electronic data storage means—with display and input means, e.g. a keyboard. The measurement data detected in an electrical-sensor-based manner are fed to the display control unit, such that the position of the target point can be determined, optically displayed and stored by the display control unit. The use of optical distance measurement makes it possible in this case for distances to be determined in a precise manner over large distances to measurement point comparatively far away.

Moreover, in many technical or industrial areas of application there is a need to measure surfaces of objects and thus also the objects themselves with high accuracy. This applies in particular to the manufacturing industry, for which the measurement and checking of surfaces of workpieces are of great importance, in particular also for quality control purposes.

Coordinate measuring machines are usually used for these applications, said coordinate measuring machines enabling precise measurement of the geometry of an object surface, typically with micrometer accuracy. Objects to be measured may be, for example, engine blocks, transmissions and tools. Known coordinate measuring machines measure the surface by producing a mechanical contact and scanning the surface. Examples thereof are gantry measuring machines, as described e.g. in DE 43 25 337 or DE 43 25 347. A different system is based on the use of an articulated arm, whose measuring sensor arranged at the end of the multipartite arm can be moved along the surface. Generic articulated arms are described for example in U.S. Pat. No. 5,402,582 or EP 1 474 650.

Moreover, in the meantime it has become customary to use optical measuring sensors in coordinate measuring machines. The optical sensors used for this purpose are based on e.g. laser light being radiated onto an object surface for interferometric measurements (EP 2 037 214). Methods based on white light interferometry (DE 10 2005 061 464) and chromatic-confocal methods (FR 273 8343) are also known.

Optical sensors and measuring methods for a coordinate measuring machine are associated with a series of advantages: the measurement is carried out contactlessly, and the optical sensor can be led over an object surface more rapidly than a tactile sensor, with a smaller physical dimensioning of the "measuring tip", as a result of which a higher lateral resolution of the measurement is made possible.

However, the optical measuring methods mentioned share the disadvantage of distance determination of only limited accuracy when unfavorable environmental influences occur, such as e.g. vibrations on the measuring apparatus, or on surfaces that are difficult to measure, which e.g. cause great scattering of the measurement radiation or have a roughness that is unfavorable with regard to the radiation properties chosen. In this case, so-called "speckle effects" can occur, which can contribute significantly to measurement uncertainty, and as a result individual recorded measurement values with respect to a defined point can be subject to great fluctuations.

More specifically, geometrical shape detection by means of optical sensors (e.g. with coordinate measuring machines) in the course of individual-point measurements on surfaces having a roughness in the range of the optical wavelength of the measurement radiation suffers from measurement uncertainties on account of the coherence of the emitted or detected radiation. In the case of narrowband light sources such as lasers, for example, the coherence of the radiation is predefined by the line width and in interferometric measurements is manifested during detection in so-called "speckles", which leads to a modulation of the detected amplitude and phase.

Although certain approaches, such as e.g. taking account of amplitude weighting in the phase determination, allow the speckle influence to be reduced, they do not allow complete elimination thereof (cf. B. Wiesner et al., "Improved white-light interferometry on rough surfaces by statistically independent speckle patterns", Appl. Opt. 51, 751-757 (2012) and EP 2 037 214 A1). In such methods, the remaining uncertainty is in the range of the roughness of the measurement object (see Paval Pavliček and Jan Soubusta, "Theoretical Measurement Uncertainty of White-Light Interferometry on Rough Surfaces", Appl. Opt. 42, 1809-1813 (2003)).

Non-phase-evaluating methods such as chromatic-confocal metrology also exhibit uncertainties on account of speckles, which arise in this case not as a result of the coherence of the source but rather as a result of the spectral filtering in the context of the measuring method. As a result, only a narrow range of the measurement radiation used is effectively available, which corresponds to a reduction of the line width of the source and can thus be equated with an increase in coherence (D. Fleischle, W. Lyda, F. Mauch, and W. Osten, "Untersuchung zum Zusammenhang von spektraler Abtastung and erreichbarer Messunsicherheit bei der chromatisch-konfokalen Mikroskopie an rauen Objekten" ["Investigation of the relationship between spectral scanning and achievable measurement uncertainty during chromatic-confocal microscopy on rough objects"], DGAO Proceedings 2010).

With regard to the measurement uncertainty caused by speckles, during spectrally resolved white light interferometry—also called Fourier-domain Optical-Coherence-Tomography (FD-OCT)—the measurement radiation is spectrally decomposed in a spectrometer with corresponding speckle sensitivity (D. C. Adler, T. H. Ko, and J. G. Fujimoto, "Speckle reduction in optical coherence tomography images by use of a spatially adaptive wavelet filter", Opt. Lett. 29, 2878-2880 (2004)).

The accuracy of scanning white light interferometry with a variable, tunable reference arm length—also called time-domain OCT—is likewise speckle-dependent. In this case, the emission width can be regarded as a bundle of individual, narrowband wave packets which are brought to interference in the case of equidistant arm lengths. The roughness of the measurement object then leads to an amplitude and phase modulation of the interferogram (A. Harasaki, J. C. Wyant, "Fringe modulation skewing effect in white-light vertical scanning interferometry", Appl. Opt. 39, 2101 (2000)).

What is common to these methods is the statistical fluctuation of the distance value during measurement point recording on rough surfaces. As a result, shape and dimensional errors of a few micrometers can occur during individual measurements e.g. on a slightly roughened surface of a calibration sphere.

Therefore, it is an object of the present invention to provide an improved method for measuring distance and an improved measuring apparatus, whereby a measured distance to a point can be determined more precisely and more reliably, in particular with a lower measurement uncertainty.

SUMMARY

The invention relates to a distance measuring method for a point to be measured on an object, comprising performing a measuring process comprising emission of measurement radiation, wherein, when an optical measurement axis of the measurement radiation is aligned with the point to be measured, an optical measurement point region is defined by the beam cross section of said radiation on the object, in particular by a cross section corresponding to a maximum of ten times, in particular a maximum of eight times, in particular a maximum of six or four times, the standard deviation σ of a Gaussian steel profile of the measurement radiation, and reception of measurement radiation reflected at the object. Moreover, the method involves determining the distance to the point on the object from the received measurement radiation of the measuring process.

According to the invention, in the context of the measuring process, this involves carrying out, at least once, alteration of a measurement direction as emission direction of the measurement radiation with respective emission and reception of the measurement radiation, wherein the alteration of the measurement direction is carried out in each case such that respective area centroids defined by the beam cross section on the object lie within the measurement point region.

The measurement point region is generally defined on the basis of the beam profile of the measurement radiation or by the beam cross section given thereby. Depending on the respective beam profile of the measurement radiation used, however, hitherto it has been possible to define the beam diameter of the measurement radiation only comparatively unsharply.

In the case of a typical use of a measurement radiation having a Gaussian beam profile, a beam diameter in connection with the present invention should be understood, for example, as that diameter which corresponds to four times the Gaussian standard deviation σ. This is equivalent to a beam diameter for which there is a decrease in intensity to approximately 13.5% ($1/e^2$) of the intensity maximum relative to the beam center. However, the region irradiated with measurement radiation on the object (on account of the Gaussian profile) is significantly larger (for example corresponding to six or eight times the standard deviation σ), the intensity decreasing greatly with increasing distance from the beam center. During a distance measurement, reflected light is also detected from these not very intensively illuminated edge regions.

In this connection—according to the invention—the optical measurement point region within which the respective area centroid for a respective measurement is arranged is defined in particular by a multiple n of the standard deviation σ of the Gaussian beam profile on the object, wherein n is maximally equal to ten, in particular maximally equal to eight.

In the case where the measurement point region is defined in a manner corresponding to ten times the standard deviation σ of the Gaussian beam profile of the measurement radiation, in the context of the individual measurements, that is to say the respective measurements with an altered measurement direction, it is possible to obtain (distance) information regarding at least the outer edge region (region outside the central beam cross section, that is to say outside four times the Gaussian standard deviation σ) of the beam cross section.

In the case where the measurement point region is defined in a manner corresponding to a maximum of eight times the standard deviation σ of the Gaussian beam profile of the measurement radiation, in the context of the individual measurements, (distance) information is obtained from at least the edge region of the central beam diameter defined by four times the standard deviation (beam diameter when the measurement axis is aligned with the point to be measured). In this case, there is at least one overlap of the beam cross section of the measurement radiation during each measurement with at least the edge of the central beam cross section defined when the measurement axis is aligned with the point to be measured. Consequently, information corresponding to at least part of the measurement area corresponding to an individual measurement of the point to be measured is detected with each measurement, wherein a statistical uncertainty for an individual measurement of the distance to the point can be reduced by accumulation and evaluation of such information.

According to the invention, the measurement point region is defined, in particular, by the cross section corresponding to a maximum of six times or four times the standard deviation σ of the Gaussian steel profile of the measurement radiation. In the case of such delimitations of the measurement point region, for respective individual measurements there is in each case a relatively large overlap region (of central beam diameter around the point to be measured and beam cross section in the respective individual measurement).

In accordance with one specific embodiment of the invention, the optical measurement point region is defined by a region whose region boundary runs in accordance with a distance from the beam center at which the measurement radiation has an intensity of $(1/e^2)$ times the intensity maximum.

A variation of the beam cross section on the object depending on the distance to the object in the case of focused or divergent radiation present is taken into account in particular in connection with considerations above.

According to the invention, therefore, at least two individual measurements are performed with respect to a point to be measured in such a way that an area centroid—generated for each measurement—of a measurement point respectively generated by the measurement radiation lies within the measurement point region. The measurement direction defined by the optical measurement axis is set in this case in particular for aligning the measurement radiation with the point to be measured or the measurement point region. Divergent, collimated or focused laser radiation can typically be used as measurement radiation.

In this case, in particular, firstly the point to be measured can be directly targeted, i.e. the optical measurement axis is aligned with the point, and a measurement signal representing distance information with respect to the point can be generated and detected. In this connection, it is possible to determine the measurement point region during this targeting e.g. by means of detection of an image of the point and of the region around the point that is illuminated by the radiation. In this case, moreover, it is possible to take account of specific object shapes, such as e.g. curved object surfaces, and distortions of the measurement point region that thus arise.

Alternatively or additionally, however, the measurement point region can also be derived from a distance to the point, which distance is determined during direct targeting of the point to be measured, and a known divergence or focusing of the measurement radiation.

In the case of a known measurement point region (e.g. in the case of a known rough distance to the object and/or little divergence or focusing of the measurement radiation), therefore, the point to be measured need not be measured directly in the context of the invention. Rather, the distance (or position) to the point can be derived from the at least two measurements within the measurement point region.

With regard to determining the distance from the measurement radiation received in the context of the measuring process, the distance can be derived by means of an averaging of the distances determined for the measurement alignments or by averaging by means of accumulation of measurement signals generated for each alignment. Consequently, a suitable method of averaging over the measurements for each alignment of the measurement radiation is used, in particular, for deriving the distance to the point to be measured by means of altering the measurement direction (whereby at least two individual measurements are performed).

In accordance with one specific embodiment of the invention, the area centroids defined by the beam cross section on the object in the context of the measuring process can be arranged in the form of a measurement path to be scanned, in particular in circular form or as two intersecting lines or in a random pattern. By means of a respectively suitable arrangement of the area centroids or by means of a corresponding suitable setting of the respective measurement directions, it is thus possible to achieve, for example, an optimum distribution of measurement points which are assigned to the measurement point region of the point to be measured, and/or efficient, rapid and accurate distance or position determination for the point.

A further embodiment according to the invention relates to the position determination for the point to be measured. In this case, for each measurement point defined depending on the alignment of the measurement direction and by the beam cross section on the object, in addition the respective measurement direction is determined and distance information is generated. Moreover, for each measurement point, a position is determined on the basis of the respective measurement direction and the distance information, in particular coordinates are determined, and for the point to be measured, a point position is derived by means of averaging on the basis of the positions of the measurement points, in particular on the basis of the point coordinates.

In accordance with a further specific embodiment of the invention, in the context of the reception of measurement radiation reflected at the object, a signal strength for the measurement radiation reflected at the object is determined, wherein this is carried out in particular continuously.

In particular, according to the invention, for each alignment of the measurement radiation, in particular for each alteration of the measurement direction, the signal strength can be determined and measurement signals generated on the basis of the respectively received measurement radiation in this case are weighted with regard to a respective distance on the basis of the signal strengths determined, and the distance to the point to be measured can be determined in a manner dependent on the measurement signals and the weighting.

By means of signal strength monitoring provided in this way, it is possible to significantly increase the accuracy of the distance determination for the point to be measured or it is possible to check distance values for individual measurement points in the context of a measuring process with regard to their plausibility and, on the basis of this, it is possible to take them into account or not take them into account.

Specifically, according to the invention the weighting can be carried out in a manner corresponding to the signal strength, wherein a larger weight factor is assigned to the measurement signals having higher signal strengths and a smaller weight factor is assigned to the measurement signals having lower signal strengths.

In addition, in accordance with a further embodiment of the invention, a position-dependent object state can be derived on the basis of the signal strength determined for each alignment of the measurement radiation, in particular wherein a topographical constitution of the object is derived from the position-dependent object states.

In particular, according to the invention the weighting can be carried out on the basis of the object state and the distance to the point to be measured can be determined in a manner dependent on the object-state-dependent weighting.

It is thereby possible, for example, to derive a rough topographical constitution of the object surface, in particular with regard to the reflection of the measurement radiation, and, on the basis of this, to rate the respective measurement values for the individual alignments of the measurement direction.

A further embodiment according to the invention relates to the weighting of the measurements in the context of the measuring process on the basis of a positioning of each measurement point relative to the point to be measured. In this connection, individual measurements assigned to the respective alignments of the measurement direction are weighted in a manner dependent on a respective distance between the area centroid of the measurement point region and the area centroid of the respective individual measurement, and the distance to the point to be measured is determined in a manner dependent on the distance-dependent weighting for the individual measurements. For this purpose, specific distance functions can be stored and it is thereby possible to achieve e.g. an overweighting for measurement points near the area centroid of the measurement point region or an underweighting for points in the edge region of the measurement point region.

In order, when deriving the distance to the point to be measured, to correspondingly take account of measurement points (in accordance with the respective alignments of the measurement direction) which, on account of a poor speckle situation, cause a lower signal strength that can be detected by a detector, a signal-dependent weighting can be introduced according to the invention. In this case, the individual positions of the measurement points $p_i$ are multiplied by their signal strengths $S_i$. The position coordinate of the individual-point probing is then equal to the weighted average value $\bar{p}$, normalized by the sum of the signal strengths $S_i$:

$$\bar{p} = \frac{\sum_i p_i \cdot S_i}{\sum_i S_i}, \text{ where } p_i = [x_i, y_i, z_i]$$

In the vicinity of object edges, at which a high signal decrease can occur, it is possible, by means of the weighting with the signal strength, to considerably reduce the erroneous influence of edge values (measured at least partly over the edge). As a result, it also becomes possible to effect an accurate and low-noise position determination for the measurement points that arise as a result of the variation of the measurement direction in regions of great height fluctuations of the object. Particularly with the use of focused measurement radiation it is possible to measure (without weighting), for parts of the individual measurements, distances which lie outside the actual measurement region (defined by the focusing of the radiation), and it is thereby also possible to generate only a very weak signal in comparison with the distances from the focus region.

This procedure is correspondingly applicable to just the distance determination (without taking account of the coordinative position) with respect to the point.

According to the invention, the alteration of the measurement direction at least once can be carried out automatically each time the distance to a point to be measured is determined or when a defined measurement condition is present. A user intervention or an additional measurement process then no longer has to be performed. However, the method according to the invention can also be performed semi-automatically; that is to say that, under specific measurement conditions, the user can issue a command for performing the measuring process according to the invention.

In the context of the present invention, in accordance with one specific embodiment, the distance determining can be carried out interferometrically.

In addition, a surface normal for the measurement point region can be determined on the basis of the measuring process according to the invention, in particular wherein the measurement direction is set depending on the surface normal.

The invention additionally relates to a measuring apparatus for determining the distance to a point to be measured on an object, comprising a distance measuring unit having a radiation source for generating a measurement radiation and a detector for receiving the measurement radiation reflected at the object, comprising alignment means for setting a measurement direction defined by the measurement radiation, wherein, when an optical measurement axis defined by the measurement radiation is aligned with the point to be measured, an optical measurement point region is defined by the steel cross section of the measurement radiation on the object, in particular by a cross section corresponding to a maximum of ten times, in particular a maximum of eight times, the standard deviation σ of a Gaussian steel profile of the measurement radiation, comprising alignment determining means for determining the measurement direction defined by the measurement radiation, and comprising a control and processing unit having a distance determining functionality, upon the performance of which the distance to the point is determined from the received measurement radiation.

According to the invention, upon the performance of the distance determining functionality in a manner controlled by the control and processing unit the following are carried out: setting of the measurement direction for aligning the measurement radiation with the point to be measured, emission of the measurement radiation and reception of measurement radiation reflected at the object. Alteration at least once of the measurement direction with respective emission and reception of the measurement radiation is also carried out, wherein the alteration of the measurement direction is carried out in each case such that respective area centroids defined by the beam cross section on the object lie within the measurement point region.

In accordance with one specific embodiment of the invention, the measuring apparatus is designed as a geodetic instrument, in particular a theodolite, total station or laser scanner. The geodetic instrument comprises a base defining a vertical axis, and an assembly connected to the base in a movable manner and rotatable relative to the base about the vertical axis, wherein the assembly defines a tilting axis. Provision is additionally made of a targeting unit, in particular telescope, which is connected to the assembly in a movable manner, is pivotable, in particular rotatable, relative to the assembly about the tilting axis and is provided for emitting the measurement radiation. In this case, the tilting axis is substantially orthogonal to the vertical axis, the targeting unit has the distance measuring unit, and provision is made of an angle measuring functionality representing the alignment determining means and serving for detecting a rotational angle defined by a relative rotational position of the assembly with respect to the base and a pivoting angle defined by a relative pivoting position of the targeting unit with respect to the assembly.

In accordance with a further specific embodiment of the invention, the measuring apparatus is designed as a coordinate measuring machine comprising a machine base, a measuring head having an, in particular detachable, optical measuring sensor, wherein the measuring sensor has the distance measuring unit, in particular wherein the measuring head is designed as a pivotable measuring head and at least partly represents the alignment means, and a frame structure having structure components for connecting the measuring head to the machine base. Furthermore, the coordinate measuring machine has at least one drive unit for providing a mobility of a first of the structure components relative to a second of the structure components or relative to the machine base in at least one direction, wherein the drive unit at least partly represents the alignment means, and at least one measuring unit for determining a relative position of the first structure component with respect to the second structure component or with respect to the machine base, wherein the measuring unit at least partly represents the alignment determining means.

With regard to the alignment of the measurement radiation, in accordance with one specific embodiment, when the distance determining functionality is performed, the measurement direction relative to the point to be measured is altered by means of a change in the position and/or alignment of the alignment means (e.g. measuring head or targeting unit) and/or the object. This can be achieved in particular by pivoting, rotation and/or displacement of the measuring head and/or of the object and/or by controlled adjustment of a micro-adjuster that the measuring sensor comprises, in particular of a piezo actuating element or scanner mirror. In this case, e.g. by means of generated vibration or shaking of the measuring head and/or of the micro-adjuster, a rapid and multiple deflection of the measurement direction can be carried out and a multiplicity of measurements with different measurement directions can be carried out as a result.

In particular, in connection with the alignment of the measurement radiation, the measurement direction relative to the point to be measured can be altered in such a way that the measurement direction is oriented parallel, in particular coaxially, with respect to a surface normal for the measurement point region. Said surface normal can be derived from the individual measurements or the totality of the measurements in particular on the basis of the measuring process in the context of the distance determining functionality.

According to the invention, the control and processing unit is designed in particular in such a way that a method according to the invention can be performed in a manner controlled by the control and processing unit.

The invention additionally relates to a computer program product, stored on a machine-readable carrier, for controlling the alteration of the measurement direction, and for performing the derivation of the distance for the point from the received measurement radiation of a method according to the invention, in particular if the computer program product is executed on a control and processing unit of a measuring apparatus according to the invention.

BRIEF DESCRIPTION OF THE DRAWINGS

The method according to the invention and the apparatus according to the invention are described in greater detail purely by way of example below on the basis of specific exemplary embodiments illustrated schematically in the drawings, further advantages of the invention also being discussed. Specifically in the figures.

DERTAILED DESCRIPTION

Figure 1A:
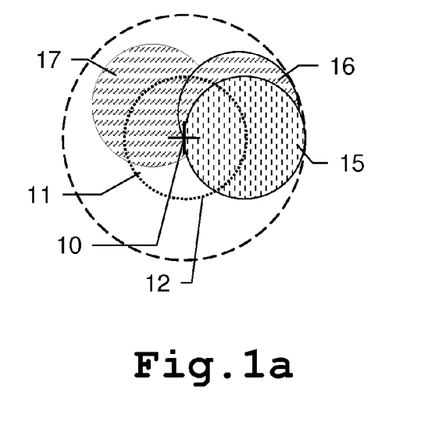
FIG. 1a-b show a sequence for a scanning method for determining a distance to a point in accordance with a respective embodiment of the present invention.

FIG. 1a shows a sequence for a scanning method for determining a distance to a point 10 in accordance with one embodiment of the present invention. The aim of the process according to the invention mentioned here is to highly accurately determine the distance to the point 10 and/or to exactly determine a position (coordinates) for the point 10.

For this purpose, a plurality of individual measurements are performed with in each case a different alignment of the measurement direction and a respective measurement point 15, 16, 17 thus defined (three shown here by way of example), wherein at least one distance, in particular additionally a measurement direction corresponding to the alignment of the measurement radiation, is determined for each measurement point 15, 16, 17. These individual measurements are furthermore carried out with in each case different alignments of the measurement radiation, such that a measurement point 15, 16, 17 that arises during each measurement is in each case offset with respect to a preceding measurement point, that is to say that a measurement point area currently generated by the optical spot size (when the measurement radiation impinges on an object) at least partly overlaps a measurement point area of one of the previous measurement.

According to the invention, the measurement points 15, 16, 17 of the individual measurements are arranged in such a way that—in the context of the respective alteration of the measurement direction—the respective area centroid thereof (which here corresponds in each case to the midpoint of the respective round measurement point 15, 16, 17) lies within the point area 11 (measurement point region), wherein the point area 11 corresponds to the area of an optical measurement point 12 generated when the optical measurement axis defined by the measurement radiation is aligned with the point 10.

The distance between the point 10 whose distance is intended to be determined and an area centroid of a measurement point 15, 16, 17 of the individual measurements is here therefore maximally equal to the radius of the measurement point 12 around the point 10.

An effectively maximally scannable measurement area—considered over the totality of the individual measurements—is accordingly four times the point area 11 scanned when determining a distance by means of solely targeting and measuring the point 10.

On the basis of such scanning (so-called "microscan") in the region of the optical spot size 12 around the point 10, the distance to the point 10 is derived from the individual measurements (distance determination for each measurement point), in particular from the distances for the measurement points 15, 16, 17 e.g. by averaging. In this case, the data generated during the "microscan" map the statistical uncertainty for the distance determination, wherein this uncertainty is in turn reduced by the averaging for outputting a single item of distance information for the point 10.

Besides the determination of the distance for the point 10, in accordance with a further embodiment of the invention, the position of the point 10 is derived in an analogous manner. For this purpose, for each measurement point 15, 16, 17, a measurement point position is determined taking account of the measurement direction of the measurement radiation that is respectively present, and an individual-point position for the point 11 is derived on the basis of the measurement point positions. Specifically, in this case respective coordinates are determined for respective points.

Figure 1B:
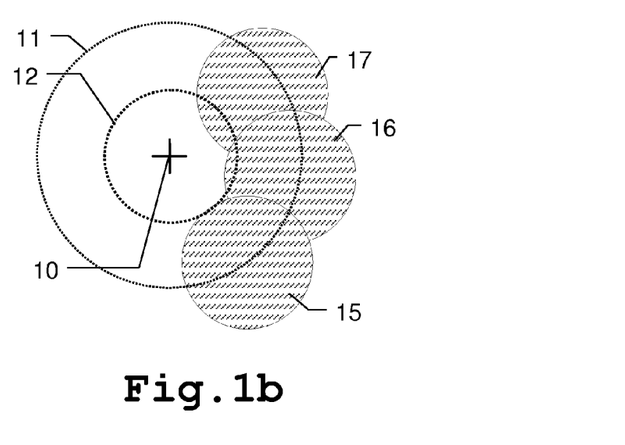

FIG. 1b shows a further embodiment for carrying out a method according to the invention. The arrangement of the measurement point 15, 16, 17 is implemented here analogously to the arrangement of the point 15, 16, 17 in accordance with FIG. 1a, but the measurement point region 11 corresponds to twice the radius of the measurement point 12, such that, during each individual measurement, at least the edge or else additionally also a part of the area of the measurement point 12 is concomitantly detected and an overlap is thus ensured. The total area that can thereby be scanned is correspondingly larger compared with the measurement area in accordance with FIG. 1a. The scanning can proceed for example in the form of a circular path or along two (e.g. orthogonally) crossing lines. Moreover, it is conceivable that rotational axes of a measuring apparatus, such as e.g. a rotary table, are taken into account during the scanning movement.

Figure 2A:
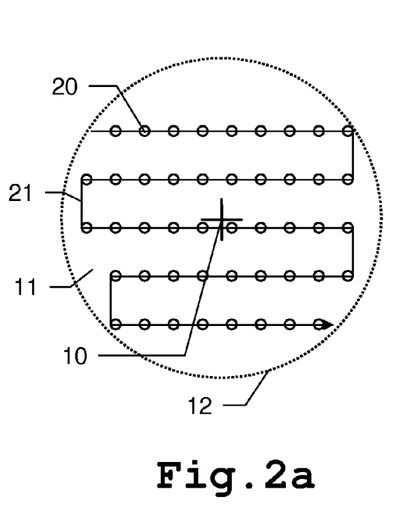
FIG. 2a-b in each case show an arrangement of measurement points for determining a distance to an individual point in accordance with the invention.
Figure 2B:
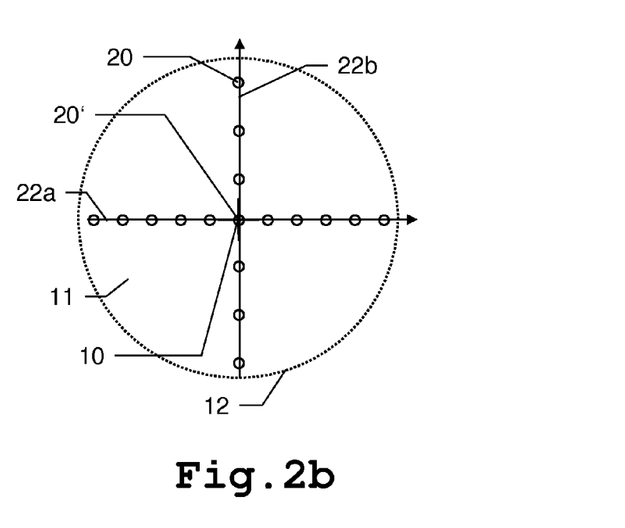

FIGS. 2a-b in each case show an arrangement of area centroids 20 for respective alignments of the measurement radiation for determining a distance to an individual point 10 in accordance with the invention. A respective measurement point and the area centroid 20 thereof are defined for each individual measurement by the impingement of the measurement radiation on the object by the optical spot size and a corresponding point area. FIGS. 2a-b in each case show the area centroids 20 for the point areas of the measurement points generated.

FIG. 2a shows a meandering arrangement (symbolized by the arrow 21) of the area centroids 20 within an individual-point area 11 (measurement point region) assigned to the individual point 10. The individual-point area 11 is defined by the size of an optical measurement point 12 that arises when the measurement radiation is aligned with the individual point 10 (substantially corresponding to the steel profile of the measurement radiation at the impingement region on the object).

With respect to each measurement point of the individual measurements or for each corresponding area centroid, a distance to the impingement point is determined. This distance can be determined for example by means of propagation time measurement, according to the phase measurement principle and/or interferometrically. The distance for the individual point 10 is subsequently derived from the individual measurements, in particular wherein an average value over the individual distances to the area centroids 20 is calculated.

In accordance with a specific embodiment of the invention, area centroid coordinates are determined for each area centroid 20, wherein the measurement direction is additionally used when determining the coordinates. Furthermore, for the individual point 10, individual-point coordinates are likewise derived from the area centroid coordinates, with the result that not only very precise distance information for the individual point 10 is present, but in addition an exact position (represented by the coordinates) for the point 10 is provided.

By means of such a meandering arrangement 21, the region within the individual-point area 11 can be scanned in an efficient manner rapidly—in particular in one go without interrupting a measurement sequence—, wherein the individual-point area 11 is covered well (and repeatedly) by the sum of the individual measurement points and, as a result, a reduced measurement uncertainty can be provided by means of averaging over a large measurement region within the individual-point area 11.

FIG. 2b shows an alternative arrangement of the area centroids 20, 20' in such a way that the latter lie along two intersecting lines 22a, b and the point of intersection of the lines 22a, b and an area centroid 20' of an individual measurement lies at the individual point 10. The individual measurement with the area centroid 20' thus corresponds to a measurement corresponding to the individual point 10 with a measurement point which corresponds in terms of position and size to the optical measurement point 12 for the individual point 10.

Figure 3A:
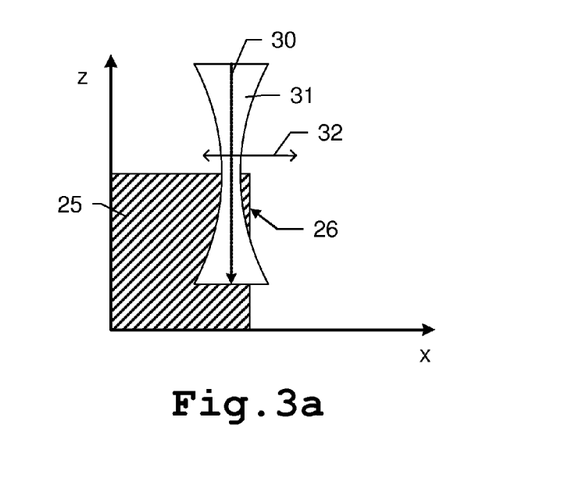
FIG. 3a-c show scanning according to the invention of a region around an individual point to be measured in the vicinity of an edge with a focused measurement beam, signal strength monitoring that is carried out in this case, and a result of a weighting of the measurement values that is dependent on said monitoring.

FIG. 3a shows scanning 32 according to the invention of a region around a point to be measured in the vicinity of an edge 26 of an object 25 with a focused measurement beam 30. The point whose distance and/or position are/is intended to be determined lies on the surface of the object 25. The illustration schematically shows a beam cross section 31 along the beam axis, wherein a surface measurement on the object 25 is performed substantially at the focus position of the beam axis (i.e. at the beam waist). With the scanning—that is to say with the performance of individual measurements with a respective measurement point for different alignments or for different x-positions of the measurement beam 30—of the object 25 along the x-axis, for respective x-positions in each case a measurement value for the z-position (=a distance to the object 25 at the location x) on the object 25 is determined.

On account of the focusing of the measurement beam 30, a signal strength S—which is additionally measurable by means of a detector—of the radiation reflected and back-scattered at the object 25 rapidly decreases greatly when the edge 26 is reached and overshot by the measurement radiation 31. Part of the measurement radiation 31 then no longer impinges on the object 25, but rather goes past the object 25 and is not—or is only to significantly lesser extents—backscattered onto the detector and detected there.

Figure 3B:
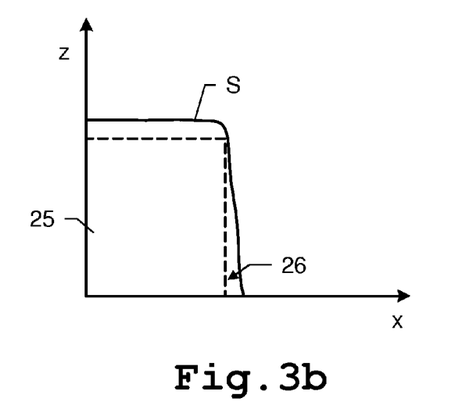

A profile of the signal strength S measured during scanning in accordance with FIG. 3a, in particular the decrease in the signal strength S at the edge 26, is illustrated in FIG. 3b. In this case, the position of the beam axis of the measurement beam 30 is plotted on the x-axis and the signal strength S measured in each case for the x-position is plotted on the z-axis. By means of such continuous determination of the signal strength S, a weighting based on the measured signal strength S can be assigned to a respective measured distance value for a measurement point and the respective distance value can be included in the calculation during the derivation of the distance for the point in accordance with the weighting.

Figure 3C:
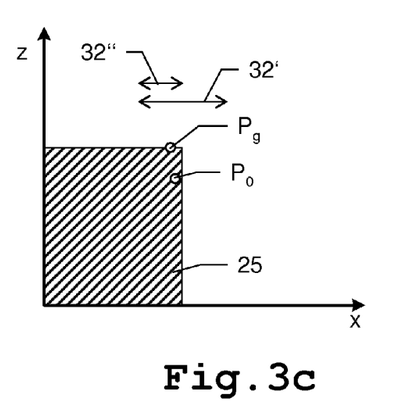

A result of a weighting according to the invention of determined individual positions $P_i$ of the generated measurement points and determination of the position for the respective measurement point on the basis of the weighting are illustrated by way of example in FIG. 3c. In this case, the arrow 32' represents an effective measurement region within which the individual measurements (with the respective measurement points) for deriving the individual-point position of the individual point are carried out.

If a focused measurement beam 30 in accordance with FIG. 3a then approaches the edge 26 of the object 25, for those measurement points which only partly still lie on the object 25 owing to the focusing of the measurement beam 30, a distance for the x-position of the measurement beam 30 is determined which would result in the determination of a point position for the measurement point within the object 25. Such a position for the measurement point is shown by way of example by the position $P_o$ calculated in this way for said point. By means of the weighting of the respective distance value on the basis of the signal strength S determined with respect to the distance value, the position for the measurement point is adapted such that the position $P_g$ now calculated in weighted fashion lies on the object 25. Consequently, this weighting ensures very precise derivation of the position for the point to be measured on the object 25, wherein only positions on the object 25 are taken into account for the plurality of measurement points. This avoids erroneously taking account of distance values which would be determined theoretically with respect to a point within the object 25.

Furthermore, the weighting of the measurements adapts or reduces the effective measurement region 32' in such a way that only positions on the surface of the object 25 are determined and, as a result, an effective data region 32" is defined. By way of example, in this case only those measurement points within the effective measurement region 32' whose measurement point area lie on the object surface to the extent of more than 50% are used for deriving the position of the individual point.

In the weighting of the individual positions $P_i$ with the respective signal strength $S_i$, the data points beyond the edge 26 are greatly underweighted. In addition, an object height can be determined very precisely by the scanning ("microscan") in proximity to the edge.

As an alternative or in addition to the signal-dependent weighting shown by FIGS. 3a-c, a spatial weighting can also be employed according to the invention. This can be implemented e.g. on the basis of a Gaussian form with a sigma value in relation to the diameter of an optical measurement spot, as a result of which a higher lateral resolution can be achieved. As a result, moreover, the effective scanning area for the "microscan" can become smaller than in the case of linear averaging.

Figure 4A:
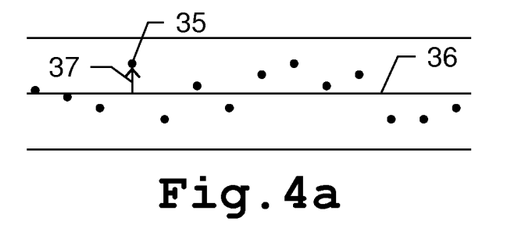
FIG. 4a-b in each case show a distribution of distance measurement values in the context of a direct individual-point measurement with respect to each point and scanning measurement according to the invention.
Figure 4B:
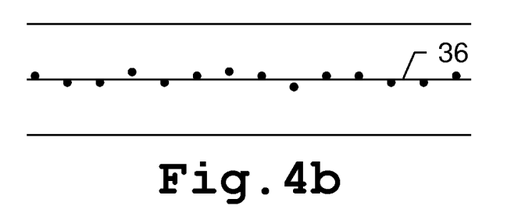

FIGS. 4a and 4b in each case show a distribution of distance measurement values with in each case only one direct individual-point measurement for each point (cf. FIG. 4a) and a scanning measurement according to the invention of each individual point (cf. FIG. 4b).

The distance measurement values (symbolized by points 35) here in each case represent a distance-appertaining or positional deviation 37 of the respective value 35 for an individual point from a desired value. The desired value in turn is predefined by the use of a calibration standard for the measurements and is represented by the line 36 for the measurements shown.

In the comparison of the two measurement series, the deviation 37 of the measurement values from the desired values for the direct individual-point measurements for each point are significantly greater than the deviations 37 for the measurement according to the invention of each individual point by scanning in the context of a plurality of individual measurements with generation of different measurement points. The accuracy in the case of a measurement according to the invention of an individual point is thus significantly greater than the accuracy in the case of a conventional direct (without the scanning of a direct point environment) distance measurement and/or position determination for the individual point.

Figure 5:
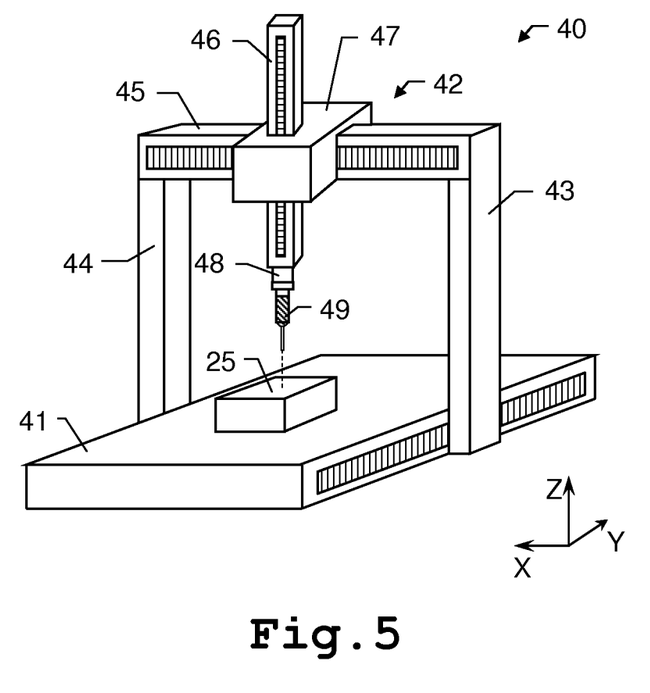
FIG. 5 shows an embodiment of a coordinate measuring machine according to the invention.

FIG. 5 shows an embodiment of a coordinate measuring machine 40 according to the invention, designed for example as a gantry coordinate measuring machine 40.

The coordinate measuring machine 40 has a base 41, on which a gantry 42 is arranged in such a way that it is movable in a longitudinal direction (Y-direction). The gantry 42 has two gantry supports 43, 44, a bridge 45 and a rod or Z-column 46, wherein the gantry supports 43, 44 are connected to one another at their upper ends via the bridge 45.

A slide 47 is arranged on the bridge 45, said slide being movable along the bridge 45, i.e. in a spatial direction (X-direction) linking the two gantry supports 43, 44. The Z-column 46 is movable in a third spatial direction (Z-direction) and is guided in a receptacle of the slide 47. For this movement in the Z-direction, the Z-column 46 is guided in bearings that are parts of the slide 47. In particular, the three spatial directions X, Y and Z are aligned perpendicularly to one another, even though this is not a prerequisite for the present invention.

The coordinate measuring machine 40 is provided for determining one or a multiplicity of measurement points on an object 25 and therefore has three linear drives for enabling a measuring head 48, which is arranged on the Z-column 46 at the lower free end thereof facing the base 41, to move in the three spatial directions X, Y and Z relative to the base 41.

Each of the linear drives has an assigned measuring element for position determination in the assigned guiding direction, for example three measuring bars for position determinations in X-, Y- and Z-directions, respectively.

The measuring head 48 is provided with a receptacle for a measuring sensor 49. The measuring sensor 49 is designed here as an optical sensor for distance measurement by means of laser radiation. Generally, the measuring head 48 can be designed to receive tactile sensors, which establish a mechanical contact with an object surface to be measured, or contactlessly measuring sensors, such as, for example, capacitive, inductive and optical (as illustrated) sensors.

In accordance with an alternative embodiment according to the invention, the measuring head 48 can be designed as a measuring head 48 which is pivotable about at least one axis.

The integration of a micro-adjuster e.g. in the form of a piezo drive or scanner mirror within the measuring sensor 49 is also conceivable. By way of example, a slight possibly resonant vibration of a light-emitting stylus (measuring sensor) would be possible in this case.

With regard to the configuration of the coordinate measuring machine 40, the invention is not restricted to a gantry assembly as illustrated in FIG. 5. Rather, any known type of coordinate measuring machines which enables object surface measurement by means of an optical sensor is suitable for the invention.

The coordinate measuring machine 40 additionally has a control and processing unit (not shown), comprising a processor and a multiplicity of data carriers. By means of the control and processing unit, in particular, the drives of the coordinate measuring machine 40 are driven and the measurement data are stored and processed. The control and processing unit is preferably designed to enable fully automatic measurement of object surfaces.

For the purposes of direct user interventions or direct user control, the control and processing unit can also be connected to a user console, in particular wirelessly e.g. via radio.

The control and processing unit is additionally designed to perform a measuring process according to the invention by means of the measurement radiation that can be emitted by the optical measuring sensor 49. In the context of said measuring process, at least two different measurement points are generated in such a way that here in each case a measurement direction defined by the measurement radiation is altered such that an area centroid of a respective measurement point which arises as a result of the radiation cross section on the object lies within a measurement point region around the point to be measured. In this case, the measurement point region is defined by the measurement point which arises as a result of the radiation cross section on the object when the measurement axis (which is defined by the measurement radiation) is aligned with the point to be measured, that is to say that the measurement point region corresponds to an optical spot size of the measurement point thus generated. A distance to the point to be measured can then be derived from the at least two individual measurements.

In this case, in particular, a measurement signal can be generated for each individual measurement. These signals can be accumulated during the individual measurements and the distance to the point can then be derived from the accumulated signals. Alternatively or additionally, a distance value can be determined as early as during each individual measurement, from the measurement radiation respectively received in this case, and the distance to the point can be determined from these distance values, in particular wherein this determination is carried out by means of an averaging over the individual measurements or over the individual distance values determined.

In accordance with a further embodiment of the invention, on the basis of the measuring process, e.g. on the basis of point coordinates respectively derived for each measurement point, a surface normal is determined for the scanned region. Specifically, a control signal can be generated from a comparison of the surface normal and the measurement direction, as a result of which the measurement direction can be aligned or adapted in such a way that this direction is oriented orthogonally with respect to the surface section taken into account in this case, or parallel, in particular coaxially, with respect to the surface normal. In particular, such alignment can be performed by means of a coordinate measuring machine having a pivotable measuring head.

Figure 6:
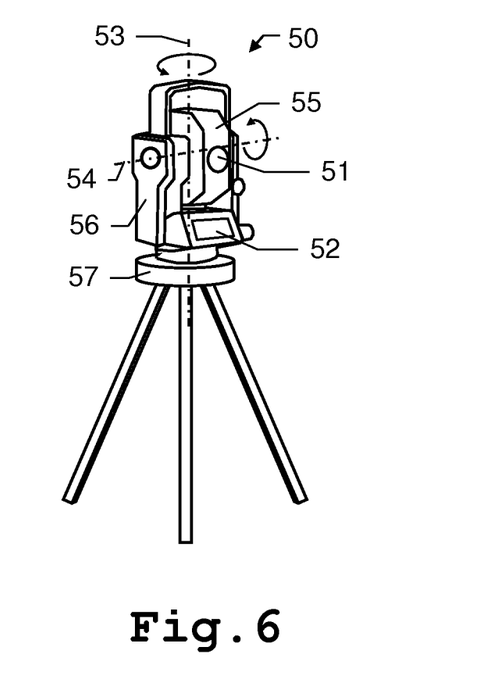
FIG. 6 shows a geodetic surveying apparatus according to the invention.

FIG. 6 shows a geodetic surveying apparatus 50 according to the invention, here a total station 50, comprising an integrated camera, wherein a detection direction of the camera has to the greatest possible extent parallel to a measurement direction of a measuring device that is likewise arranged in the surveying apparatus. In other words, a detection axis of the camera runs at least parallel, in particular coaxially, with respect to a measurement axis defined by a measurement radiation that can be emitted. A field of view for the camera and the measurement radiation is defined by an exit optical unit.

Furthermore, the surveying apparatus 50 is provided with an output unit 52, in particular with a display, on which images detected by the camera can be represented. Moreover, the apparatus has two mutually perpendicular axes 53, 54 (vertical axis 53 and tilting axis 54) for alignment with an object. The surveying apparatus 50, or the measurement radiation that can be emitted, can thus be aligned with a point to be measured by means of the rotation of the targeting unit 55 about one or both axes 53, 54. For this purpose the targeting unit 55 is mounted in a support 56 in a manner rotatable about the tilting axis 54, and the support 56 is arranged on a base 57 in a manner rotatable about the vertical axis 53.

In order to determine a distance and/or a position of a target measurement point, the surveying apparatus 50 is designed to perform a method according to the invention, wherein, in the context of a measuring process carried out in this case, the measurement radiation is emitted to the point to be measured and the radiation reflected there is received. In addition, a plurality of individual measurements are carried out with respect to the point. In this case, the measurement direction of the radiation is in each case altered such that a measurement point defined by the measurement radiation during the respective individual measurement is arranged in such a way that the area centroid—defined by the beam cross section on the object—of said measurement point lies within a defined measurement point region. The measurement region is defined by the steel cross section of the measurement radiation when the measurement axis is aligned directly with the measurement point and the region defined thereby on the object. The distance and/or the position of the measurement point are/is then derived from the individual measurements carried out.

It goes without saying that these illustrated figures merely schematically illustrate possible exemplary embodiments. The various approaches can, according to the invention, likewise be combined with one another and with methods for determining the distance to objects and with generic measuring apparatuses, in particular coordinate measuring machines or total stations, from the prior art.

What is claimed is:

1. A distance measuring method for a point to be measured on an object, comprising:
   emitting measurement radiation, wherein, when an optical measurement axis of the measurement radiation is aligned with the point to be measured, an optical measurement point region is defined by the beam cross section of the radiation on the object;
   receiving measurement radiation that has been reflected from the object; and
   determining the distance to the point on the object from the received measurement radiation, wherein:
      emitting the measurement radiation includes at least once, altering an emission direction of the measurement radiation with respective emission and reception of the measurement radiation,
   wherein:
      altering the emission direction is performed such that, each time the emission direction is altered, an area centroid defined by the beam cross section on the object lies within the measurement point region.

2. The method according to claim 1, wherein:
   the optical measurement point region is defined by the beam cross section, which corresponds to a maximum of ten times the standard deviation of a Gaussian beam profile of the measurement radiation.

3. The method according to claim 2, wherein:
the beam cross section corresponds to a maximum of eight times the standard deviation of a Gaussian beam profile of the measurement radiation.

4. The method according to claim 1, further comprising:
altering the emission direction of the measurement radiation a plurality of times with respective emission and reception of the measurement radiation, wherein:
a plurality of area centroids, which are defined on the object by altering the emission direction, are arranged in the form of a measurement path to be scanned.

5. The method according to claim 4, wherein:
the plurality of area centroids are arranged:
 in circular form;
 as two intersecting lines; or
 in a random pattern.

6. The method according to claim 1, wherein:
the optical measurement point region is defined by a region having a boundary that runs in accordance with a distance from the beam center at which the measurement radiation has an intensity of approximately $(1/e2)$ times the intensity maximum.

7. The method according to claim 1, wherein:
for each measurement point, which is defined depending on the alignment of the measurement direction and by the beam cross section on the object, there is also a determining of the respective measurement direction and a deriving of the respective distance information; and
a position for each measurement point is determined based on the respective measurement direction and the respective distance information; and
a point position of the point to be measured is derived by an averaging based on the positions of the measurement points.

8. The method according to claim 1, wherein:
receiving measurement radiation that has been reflected from the object comprises determining a signal strength for the measurement radiation reflected at the object.

9. The method according to claim 8, wherein:
for each alteration of the emission direction, the signal strength is determined and measurement signals generated on the basis of the respectively received measurement radiation are weighted with regard to a respective distance on the basis of the signal strengths determined in the manner corresponding to the signal strength, and the distance to the point to be measured is determined in a manner dependent on the measurement signals and the weighting.

10. The method according to claim 8, wherein:
a position-dependent object state is derived on the basis of the signal strength determined for each alignment of the emission direction, wherein a topographical constitution of the object is derived from the position-dependent object states.

11. The method according to claim 10, wherein:
the weighting is carried out on the basis of the object state and the distance to the point to be measured is determined in a manner dependent on the object-state-dependent weighting.

12. The method according claim 1, wherein:
individual measurements assigned to respective alignments of the emission direction are weighted in a manner dependent on a respective distance between the area centroid of the measurement point region and the area centroid of the respective individual measurement, and the distance to the point to be measured is determined in a manner dependent on the distance-dependent weighting for the individual measurements.

13. The method according to claim 1, wherein:
altering the emission direction at least once is carried out automatically each time the distance to a point to be measured is determined or when a defined measurement condition is present, and/or
the distance determining is carried out interferometrically, and/or
a surface normal for the measurement point region is determined on the basis of the measuring process, wherein the emission direction is set depending on the surface normal.

14. A computer program product, stored on a non-transitory machine-readable carrier, said computer program product having code that, when executed by a processing device performs a method that comprises:
controlling the alteration of the measurement direction of claim 1, and
performing the derivation of the distance for the point from the received measurement radiation of the method according to claim 1.

* * * * *